US010056796B2

(12) United States Patent
Kobayashi et al.

(10) Patent No.: US 10,056,796 B2
(45) Date of Patent: Aug. 21, 2018

(54) INDUCTION HEATING DEVICE, JOINING METHOD, JOINED COMPONENT AND ROTARY ELECTRIC MACHINE INCLUDING THE SAME

(71) Applicant: KABUSHIKI KAISHA TOSHIBA, Minato-ku (JP)

(72) Inventors: Noriyasu Kobayashi, Yokohama (JP); Souichi Ueno, Ota (JP); Tomoaki Takahashi, Yokohama (JP); Daisuke Iwashita, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 302 days.

(21) Appl. No.: 15/164,021

(22) Filed: May 25, 2016

(65) Prior Publication Data

US 2017/0264154 A1    Sep. 14, 2017

(30) Foreign Application Priority Data

Mar. 8, 2016   (JP) ................................ 2016-044837

(51) Int. Cl.
| H02K 11/00 | (2016.01) |
| H02K 3/04 | (2006.01) |
| H02K 15/02 | (2006.01) |
| H05B 6/10 | (2006.01) |

(52) U.S. Cl.
CPC ............... *H02K 3/04* (2013.01); *H02K 15/02* (2013.01); *H05B 6/101* (2013.01)

(58) Field of Classification Search
CPC ........... H02K 3/04; H02K 15/02; H05B 6/101
See application file for complete search history.

(56) References Cited

U.S. PATENT DOCUMENTS

| 2004/0099660 | A1* | 5/2004 | Matsen | ................. | B23K 13/01 |
| | | | | | 219/634 |
| 2004/0245244 | A1* | 12/2004 | Hirota | ................. | H05B 6/1254 |
| | | | | | 219/624 |
| 2006/0108355 | A1* | 5/2006 | Breznak | ............... | B23K 1/0008 |
| | | | | | 219/615 |

(Continued)

FOREIGN PATENT DOCUMENTS

| JP | 2004-327375 | 11/2004 |
| JP | 2005-259575 | 9/2005 |
| JP | 2011-25249 | 2/2011 |

*Primary Examiner* — Thanh Lam
(74) *Attorney, Agent, or Firm* — Oblon, McClelland, Maier & Neustadt, L.L.P.

(57) ABSTRACT

A joined component comprises a first heated body, a second heated body, a brazing material, a first heated portion and a second heated portion. The first body comprises an insertion opening and an inserted portion coupled with the insertion opening. The second body comprises an insertion portion inserted into the inserted portion through the insertion opening. The first heated portion is provided at a first position including at least a part of the inserted portion and at least a part of the insertion portion. The second heated portion is provided at a second position separate from the insertion portion where a ratio "L/D" satisfies being 0.4 or more and 0.8 or less, where "L" is a length from the insertion opening to the second portion and "D" is an outer diameter of the second heated body.

8 Claims, 8 Drawing Sheets

(56) References Cited

U.S. PATENT DOCUMENTS

2006/0138894 A1* 6/2006 Harada ................ H02K 1/28
                                                  310/216.004
2010/0295412 A1* 11/2010 Matsumoto ........... H02K 15/12
                                                  310/273
2011/0083467 A1* 4/2011 Asano ................ F25B 49/025
                                                  62/498

* cited by examiner

INDUCTION HEATING DEVICE, JOINING METHOD, JOINED COMPONENT AND ROTARY ELECTRIC MACHINE INCLUDING THE SAME

CROSS-REFERENCE TO RELATED APPLICATIONS

This application is based upon and claims the benefit of priority from Japanese Patent Application No. 2016-044837, filed on Mar. 8, 2016, the entire contents of which are incorporated herein by reference.

FIELD

Embodiments described herein relate generally to an induction heating device, a joining method, a joined component and a rotary electric machine including the same.

BACKGROUND

Conventionally, as a technique of brazing to join components together, there is a technique to obtain a joined component by heating the components with flame of a torch and melting a brazing material for the execution. However, in the case of this technique, the execution place is limited to a place where a flame can be safely handled.

As another brazing technique, there is also known a technique of induction heating not using a flame. In this case, a periphery of the components is enclosed by a heating conductor (induction heating coil) and a high frequency current is caused to flow in the heating conductor. Thereby, an eddy current is induced in the surfaces of the components. The induced eddy current generates heat in the surface layers of the components based on a loss by Joule heat. This heat heats the components and brazing is performed to afford the joined component. In the case of brazing by induction heating, flame is not used, which eases the restriction to the execution place.

DETAILED DESCRIPTION

There is provided a joined component according to an embodiment comprising: a first heated body; a second heated body; a brazing material; a first heated portion; and a second heated portion. The first heated body comprises an insertion opening and an inserted portion coupled with the insertion opening. The second heated body comprises an insertion portion inserted into the inserted portion through the insertion opening. The brazing material is disposed between the insertion portion and the inserted portion, thereby joining the first heated body and the second heated body together. The first heated portion is provided at a first position including at least a part of the inserted portion and at least a part of the insertion portion. The second heated portion is provided at a second position separate from the insertion portion where a ratio "L/D" satisfies to be 0.4 or more and 0.8 or less, where "L" is a length from the insertion opening to the second heated portion and "D" is an outer diameter of the second heated body.

There in provided an induction heating device according to an embodiment comprising: a first heating conductor and a second heating conductor. The first heating conductor is conductor configured to circumferentially cover at least a part of a periphery of a first heated body. The second heating conductor is configured to circumferentially cover at least part of a periphery of a second heated body. The first heated body comprises an insertion opening and the inserted portion coupled with the insertion opening. The second heated body comprises an insertion portion inserted into the inserted portion through the insertion opening. A brazing material, configured to join the first heated body and the second heated body together, is disposed between the insertion portion and the inserted portion. The first heating conductor is configured to heat a first position including at least a part of the inserted portion and at least a part of the insertion portion. The second heating conductor is configured to heat a second position separate from the insertion portion where a ratio "L/D" satisfies to be 0.4 or more and 0.8 or less, where "L" is a length from the insertion opening to the second position and "D" is an outer diameter of the second heated body.

There is provided a joining method according to an embodiment comprising: providing a first heated body comprising an insertion opening and an inserted portion coupled with the insertion opening; providing a second heated body comprising an insertion portion configured to be inserted into the inserted portion through the insertion opening; inserting the insertion portion of the second heated body into the inserted portion of the first heated body through the insertion opening; disposing a brazing material between the inserted portion and the insertion portion; inductively heating a first position including at least part of the inserted portion and the insertion portion; and inductively heating a second position that is other than the insertion portion, wherein a location of the second position satisfies a ratio "L/D" to be 0.4 or more and 0.8 or less, where "L" is a length from the insertion opening of the first heated body to the second position and "D" is an outer diameter of the second heated body.

Hereafter, an induction heating device, a joining method, a joined component, and a rotary electric machine including the same according to an embodiment are described with reference to the drawings. Notably, constituents having equivalent functions are given the same signs in the figures, and detailed description of the constituents with the same signs is not repeated.

An induction heating device 1 according to an embodiment is an induction heating device which brazes and joins two heated bodies together by induction heating. These two heated bodies are brazed to afford a joined component 100 according to the present embodiment.

Figure 7:
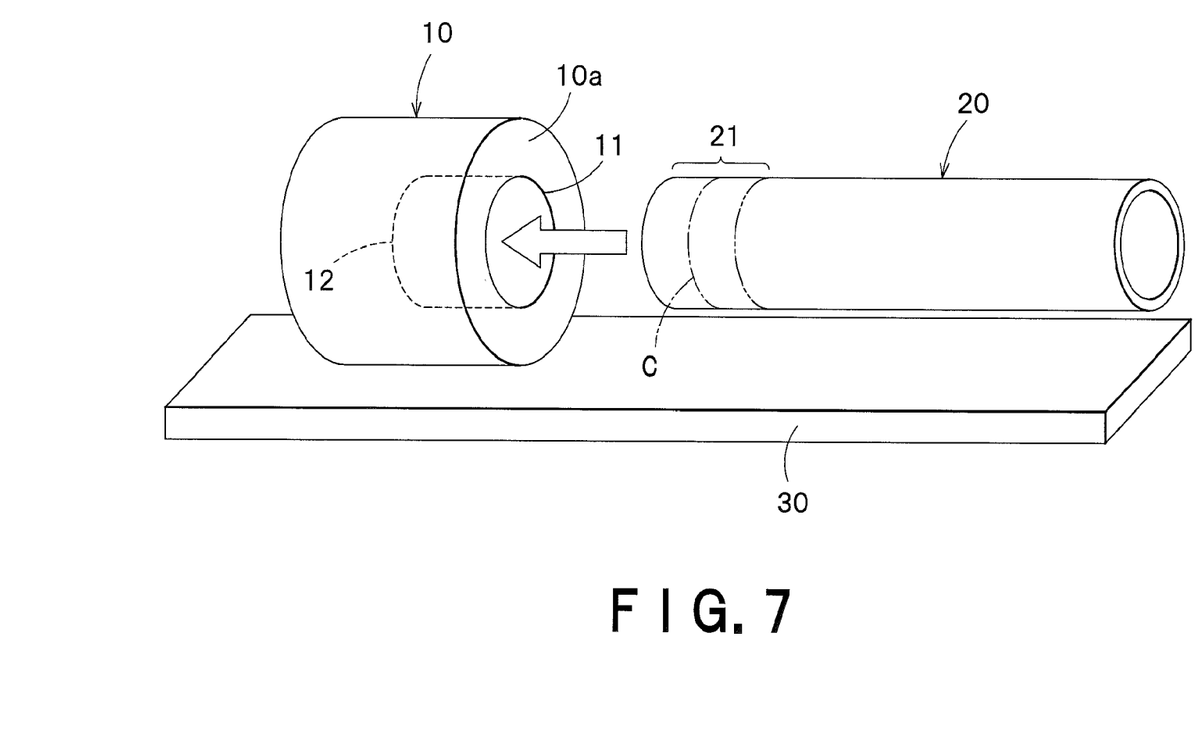
FIG. 7 is a diagram illustrating a first heated body 10 and a second heated body 20 inserted into an inserted portion 12 of the first heated body 10.

Herein, referring to FIG. 7, a first heated body 10 and a second heated body 20 which are the heated bodies, and the joined component 100 obtained by joining these together are described. An inserted portion 12 is recessed on an end face 10a of the first heated body 10. An insertion opening 11 is an opening portion of the inserted portion 12. An insertion portion 21 is provided in a tip portion of the second heated body 20. Notably, FIG. 7 does not illustrate a high heat capacity portion 22 (mentioned later) of the second heated body 20. As illustrated in FIG. 7, the first heated body 10 and the second heated body 20 are tubular members. An obstacle 30 is provided on the first heated body 10 and the second heated body 20. The obstacle 30 is a structure or the like which is connected to the first heated body 10 and the second heated body 20 or which is installed at a position in the vicinity of those.

Figure 8:
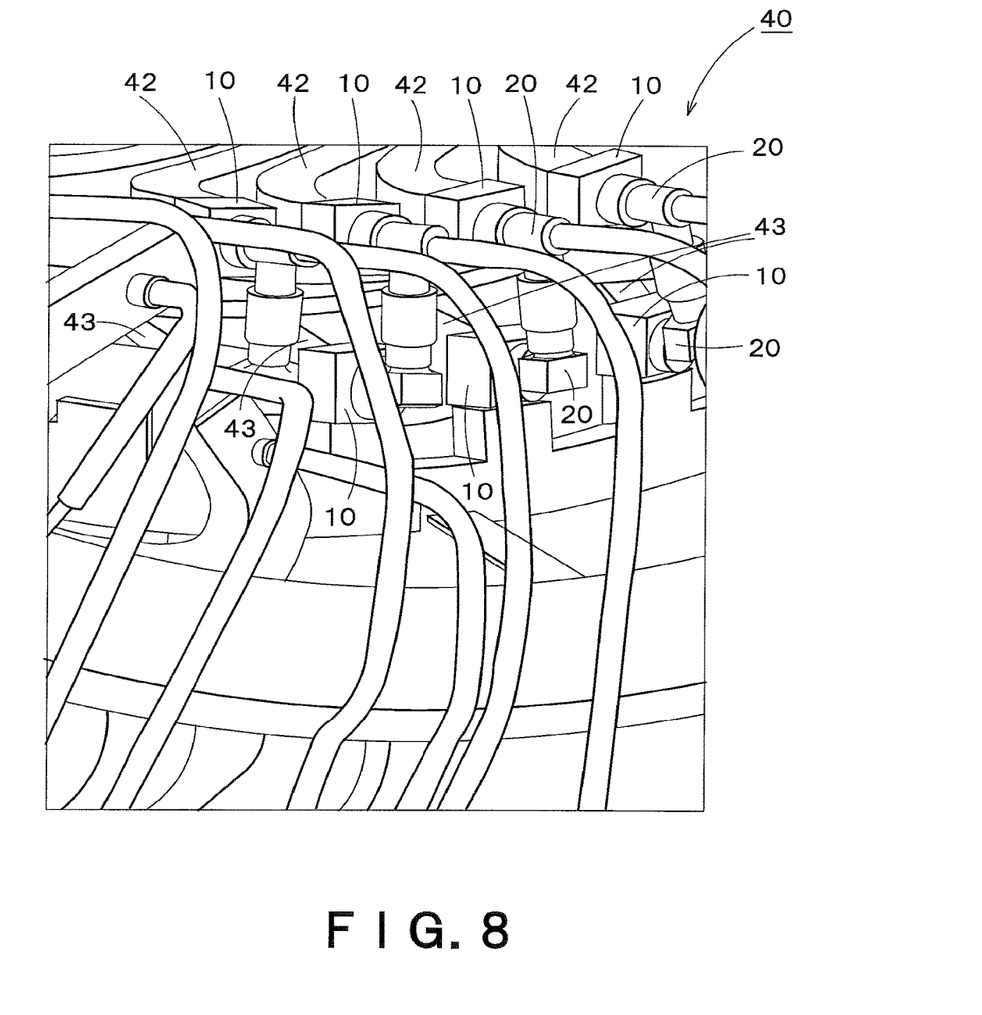
FIG. 8 is a perspective view illustrating a part of a stator 40.

Herein, referring to FIG. 8, a rotary electric machine (generator) according to the present embodiment is described. FIG. 8 is a perspective view illustrating a part of a stator 40 of the rotary electric machine. In this rotary electric machine, the stator 40 corresponds to the aforementioned obstacle 30. Inner coils 42 are provided along an inner wall surface of the cylindrical stator 40. Moreover, outer coils 43 are provided along an outer wall surface of the stator 40. Cooling water flows through the insides of the inner coils 42 and the outer coils 43.

The first heated body 10 is provided in an end portion of one coil of the inner coil 42 and the outer coil 43. The second heated body 20 is provided in an end portion of the other coil of the inner coil 42 and the outer coil 43. In the present embodiment, the first heated body 10 is a tubular member which is provided in an end portion of the inner coil 42 or the outer coil 43 and through the inside of which cooling water flows. The second heated body 20 is a member which connects the first heated body 10 of the inner coil 42 and the first heated body 10 of the outer coil 43 together in an end portion of the stator 40. Namely, as illustrated in FIG. 8, the second heated body 20 connects the inner coil 42 and the outer coil 43 together over an end face of the stator 40. This second heated body 20 is a tubular member which secures electric conduction and is a cooling water channel.

Returning to FIG. 7, the description of the first heated body 10 and the second heated body 20 is continued. In FIG. 7, a center line C of the insertion portion 21 of the second heated body 20 indicates a position separate from the tip of the second heated body 20 by a half a length of the insertion portion 21.

The second heated body 20 is inserted into the inserted portion 12 through the insertion opening 11 of the first heated body 10. More in detail, the insertion portion 21 which is a tip portion of the second heated body 20 is inserted into the inserted portion 12, and an outer circumferential surface of the insertion portion 21 is a brazing surface to which the first heated body 10 is brazed. Notably, the first heated body 10 and the second heated body 20 are not limited to tubular members. Namely, the joined component 100 according to the present embodiment is constituted of: the first heated body 10 including the insertion opening 11 and the inserted portion 12; the second heated body including the insertion portion 21 which is inserted into the inserted portion 12 through the insertion opening 11; and a brazing material 25 which is disposed between the insertion portion 21 and the inserted portion 12 and joins the first heated body 10 and the second heated body 20 together. The first heated body 10 and the second heated body 20 are joined together with the brazing material 25 disposed between the insertion portion 21 and the inserted portion 12.

Next, a configuration of the induction heating device 1 and the joined component 100 according to the embodiment is described with reference to FIG. 1.

Figure 1:
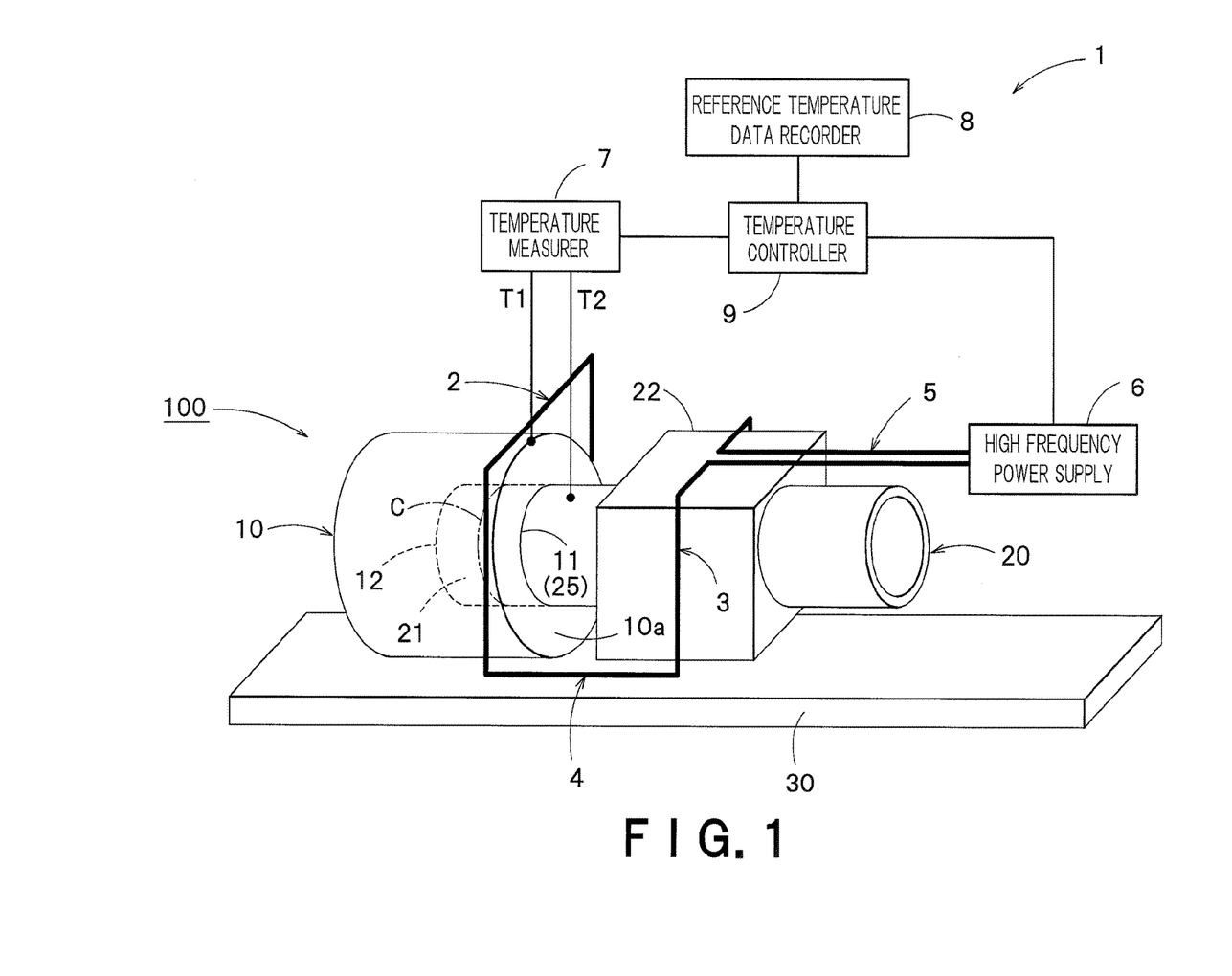
FIG. 1 is a diagram illustrating a schematic configuration of an induction heating device 1 and a joined component 100 according to an embodiment of the present invention.

As illustrated in FIG. 1, the induction heating device 1 includes a first heating conductor portion (induction heating coil) 2, a second heating conductor portion (induction heating coil) 3, a connection conductor portion 4, a leading-out conductor portion 5, a high frequency power supply 6, a temperature detector 7, a reference temperature data recorder 8 and a temperature controller 9.

Each of the first heating conductor portion 2, the second heating conductor portion 3, the connection conductor portion 4 and the leading-out conductor portion 5 is composed of a conductive material and they form one conduction path. Notably, a flow channel through which a cooling medium such as water flows may also be provided inside the conduction path. A high frequency current outputted from the high frequency power supply 6 flows through the conduction path, and thereby, an eddy current flows through surface layers of the heated bodies peripheries of which the conduction path covers to heat the heated bodies with Joule heat. More in detail, induction heating first raises a temperature of the surface layers of the heated bodies, after that, diffusion of the Joule heat raises a temperature inside the heated bodies and raises a temperature of the surface layers around the conduction path. After that, when a temperature of a brazing portion (portion of the first heated body 10 and the second heated body 20 overlapping with each other) rises at a predetermined temperature, a brazing material is melted and sent into the brazing portion to perform brazing (so-called "face-fed brazing"). Herein, in the present embodiment, the brazing portion is a portion including an inner wall of the inserted portion 12 of the first heated body 10 and an outer wall of the insertion portion 21 of the second heated body 20. Notably, a brazing material may also be beforehand disposed in a groove formed in the brazing portion or may also be similarly processed to beforehand provide the brazing material in the brazing portion (so-called "preplace brazing").

Figure 2:
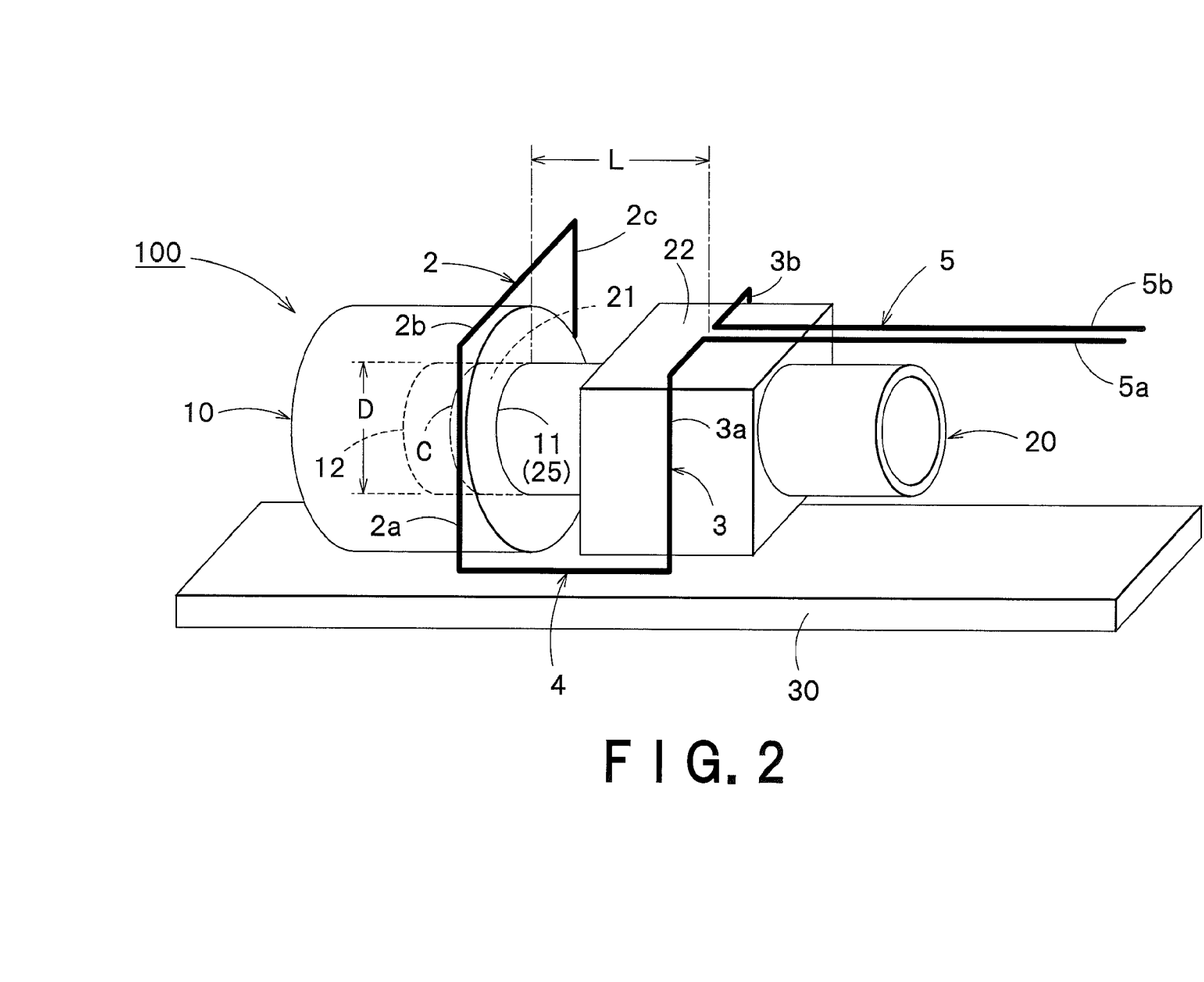
FIG. 2 is a diagram for explaining details of heating conductor portions of the induction heating device 1.

The first heating conductor portion 2 circumferentially covers a part of a periphery of the inserted portion 12 of the first heated body 10 (in the circumferential direction thereof). In the present embodiment, as illustrated in FIG. 1, the first heating conductor portion 2 covers a part of the periphery of the inserted portion 12 so as to avoid the obstacle 30. More in detail, as illustrated in FIG. 2, the first heating conductor portion 2 is configured to have a conductor tube 2a, a conductor tube 2b and a conductor tube 2c connected to one another. The conductor tubes 2a and 2c extend in a direction perpendicular to a center axis of the first heated body 10. The conductor tube 2b connects an upper end portion of the conductor tube 2a and an upper end portion of the conductor tube 2c together. In this way, the first heating conductor portion 2 is configured to cover at least part of the periphery of the inserted portion 12, and thereby, the brazing portion can be efficiently heated. In the joined component 100 of the present embodiment, at least part of the inserted portion 12 of the first heated body 10 and at least part of the insertion portion 21 of the second heated body 20 constitute a first heated portion.

Notably, in view of efficiency, the first heating conductor portion 2 is preferably provided in the periphery of the first heated body 10 so as to cover the center line C of the insertion portion 21 inserted into the inserted portion 12. Namely, a projection line of the first heating conductor portion 2 onto the insertion portion 21 preferably overlaps with the center line C. In this way, the first heating conductor portion 2 can most efficiently heat the brazing portion. Otherwise, a center part on induction heating with the first heating conductor portion 2 in the longitudinal direction is preferably disposed between a position of overlapping with the center line C of the insertion portion 21 and the insertion opening 11 of the inserted portion 12.

The second heating conductor portion 3 circumferentially covers at least part of a periphery of a portion other than the insertion portion 21 of the second heated body 20. Namely, the second heated body 20 includes a second heated portion at a position separate from the insertion portion 21. The second heated portion is at least part of the portion other than the insertion portion 21 of the second heated body 20. The second heating conductor portion 3 circumferentially covers at least part of the periphery of the second heated portion. In the present embodiment, as illustrated in FIG. 1, the second heating conductor portion 3 covers a part of the periphery of the second heated body 20 so as to avoid the obstacle 30.

More in detail, as illustrated in FIG. 2, the second heating conductor portion 3 has a conductor tube 3a and a conductor tube 3b. As to the conductor tubes 3a and 3b, lower end portions of these are connected to the connection conductor portion 4, after extending along a direction perpendicular to a center axis of the second heated body 20 over lateral faces of the high heat capacity portion 22, those are bent to extend over an upper face of the high heat capacity portion 22. The high heat capacity portion 22 is a portion higher in heat capacity than the other portion of the second heated body. In the present embodiment, the high heat capacity portion 22 is a portion (thick portion) which is configured to be thicker than the periphery partially of the second heated body 20 which is a tubular member. The high heat capacity portion 22 constitutes the second heated portion. Notably, the high heat capacity portion 22 which is the second heated portion is not limited to the thick portion but may also be a portion (high specific heat portion) which is composed of a material higher in specific heat than the periphery partially of the second heated body 20 which is a tubular member.

In the second heating conductor portion 3 of the present embodiment, as illustrated in FIG. 2, center portions of the conductor tubes 3a and 3b in the longitudinal direction are provided in the periphery in the vicinity of a center portion of the second heated body 20 in the longitudinal direction of the high heat capacity portion 22 of the second heated body 20 which is a tubular member. In this way, more calorie can be stored in the second heated body 20, which enables the brazing portion to be efficiently heated.

Notably, in actual brazing operation, the induction heating device 1 including the first heating conductor portion 2 and the second heating conductor portion 3 is fixed at a predetermined position by manual operation of an operator or using a jig. Due to this, precision of positioning does not necessarily allow a position where the second induction heating portion 3 is disposed to strictly coincide with the second heated portion of the second heated body 20 (namely, the center portion (center) of the high heat capacity portion 22 of the second heated body 20 in the longitudinal direction). Nevertheless, the operator in performing the positioning of the induction heating device 1 may be instructed to allow the center portion on induction heating with the conductor tubes 3a and 3b of the second heating conductor portion 3 in the longitudinal direction to coincide with the center portion (center position) of the second heated portion of the second heated body 20 in the longitudinal direction. Otherwise, a jig that can perform such positioning may also be used. In this way, the position where the second induction heating portion 3 is disposed can be allowed to substantially coincide with the position of the second heated portion of the second heated body 20, so that the brazing portion can be efficiently heated. Otherwise, a mark or the like indicating the position where first heating conductor portion 2 is disposed may also be displayed in the periphery of the first heated body 10 to dispose the first heating conductor portion 2 at this position, and thereby, the second heating conductor portion 3 may also be disposed in the center portion of the second heated portion of the second heated body 20 in the longitudinal direction.

The connection conductor portion 4 connects the first heating conductor portion 2 and the second heating conductor portion 3 together. More in detail, as illustrated in FIG. 2, the connection conductor portion 4 connects the conductor tube 2a and the conductor tube 3a together and connects the conductor tube 2c and the conductor tube 3b together. To provide the connection conductor portion 4 enables induction heating on both the first heated body 10 and the second heated body 20 with one high frequency power supply 6. As a result, the induction heating device 1 can be simplified with low costs and control of the high frequency power supply 6 can be made easy. Notably, without providing the connection conductor portion 4, the first heating conductor portion 2 and the second heating conductor portion 3 may also be connected to separate high frequency power supplies.

The leading-out conductor portion 5 electrically connects the second heating conductor portion 3 and the high frequency power supply 6 together. More in detail, the leading-out conductor portion 5 has a conductor tube 5a connected to the conductor tube 3a and a conductor tube 5b connected to the conductor tube 3b. As illustrated in FIG. 2, the conductor tube 5a and the conductor tube 5b are preferably arranged parallel to each other and close to each other. By doing so, magnetic fields formed by the conductor tube 5a and the conductor tube 5b cancel each other, which can suppress the second heated body 20 from being heated too much.

Furthermore, an inductance present between both conductor tubes can be made small, which can improve power supply efficiency. Notably, the conductor tubes 2a, 2b, 2c, 3a, 3b, 5a and 5a and the like are not necessarily tubular but may also be filled or strip-shaped conductors. Moreover, as to outer shapes in cross sections perpendicular to the longitudinal direction, various shapes such as an ellipsoid and a rectangle as well as a circle may also be employed.

The high frequency power supply 6 causes a high frequency current to flow in the first heating conductor portion 2 and the second heating conductor portion 3 via the connection conductor portion 4 and the leading-out conductor portion 5. This high frequency current outputted from the high frequency power supply 6 can be changed in current value and frequency. To cause the high frequency current to flow in the first heating conductor portion 2 and the second heating conductor portion 3 induces an eddy current in the surface layer of each of the first heated body 10 and the second heated body 20 to heat the first heated body 10 and the second heated body 20 with Joule heat.

The temperature detector 7 measures temperatures of the surfaces of the heated bodies. More in detail, the temperature detector 7 measures a temperature "T1" of the first heated body 10 in the vicinity of the insertion opening 11 of the first heated body 10 (for example, at a point on the end face 10a of the first heated body 10). The temperature detector 7 is constituted, for example, of a thermocouple or a radiation thermometer.

Notably, the temperature detector 7 may also measure a temperature "T2" of the second heated body 20 in the vicinity of the insertion opening 11 as well as the temperature "T1" or in place of the temperature "T1". For example, the temperature detector 7 measures a temperature of an outer circumferential surface of the second heated body 20 other than the brazing portion in the vicinity of the insertion opening 11.

The reference temperature data recorder 8 stores temperature data in which the temperature "T1" is associated with a temperature "T3" of the brazing portion. The temperature data is obtained through a beforehand performed heating test. The temperature "T3" is, for example, a temperature of the outer circumferential surface of the insertion portion 21 of the second heated body 20. Not limited to this, it may also be a temperature of the insertion opening 11 or may also be a temperature of an inner circumferential face of the inserted portion 12 of the first heated body 10. The reference temperature data recorder 8 is constituted of a hard disk, a semiconductor memory or a recording medium such as an optical disc.

Notably, the reference temperature data recorder 8 may also store temperature data in which the temperature "T2" is associated with the temperature "T3" or may also store temperature data in which the temperature "T1", the temperature "T2" and the temperature "T3" are associated with one another.

The temperature controller 9 controls the high frequency power supply 6 such that the temperature of the brazing portion becomes a predetermined temperature, based on the temperatures measured by the temperature detector 7 and the temperature data stored in the reference temperature data recorder 8. Specifically, the temperature controller 9 adjusts the temperature of the brazing portion by changing the current value (current amplitude) and the frequency of the high frequency current outputted from the high frequency power supply 6. For example, the temperature controller 9 estimates the temperature of the brazing portion from the temperature measured by the temperature detector 7 through interpolation processing to interpolate gaps between the temperature data, and controls the high frequency power supply 6 such that the estimated temperature becomes a predetermined temperature.

Notably, the temperature controller 9 may also control the high frequency power supply 6 such that the temperature of the first heated body 10 in the vicinity of the insertion opening 11 of the first heated body 10 and/or the temperature of the second heated body 20 in the vicinity of the insertion opening 11 become predetermined temperatures.

The aforementioned predetermined temperature (namely, target temperature of the brazing portion) is preferably a temperature determined based on a type of the brazing material, the melting point of the brazing material and the like. In this way, more uniform and excellent brazing can be performed.

As described above, the induction heating device 1 according to the present embodiment is provided with the first heating conductor portion 2 and the second heating conductor portion 3, between which the insertion opening 11 is interposed. To cause the high frequency current to flow in the first and second heating conductor portions 2 and 3 individually inductively heats the first heated body 10 and the second heated body 20. Thermal conduction of the heat based on the eddy current which arises in the surface layers of the first heated body 10 and the second heated body 20 takes place into the inside with diffusion thereof. Accordingly, even if the first heating conductor portion 2 and the second heating conductor portion 3 do not respectively cover the whole peripheries of the first heated body 10 and the second heated body 20, the whole periphery of the brazing portion of the first and second heated bodies 10 and 20 can be uniformly heated, which enables uniform and excellent brazing to be performed.

Moreover, the joined component 100 according to the present embodiment is constituted of the first heated body 10 including the insertion opening 11, and the inserted portion 12 at least part of which constitutes the first heated portion, the second heated body 20 including the insertion portion 21 which is inserted into the inserted portion 12 through the insertion opening 11 and at least part of which constitutes the first heated portion, and the second heated portion provided separate from the insertion portion 21, and the brazing material 25 disposed between the insertion portion 21 and the inserted portion 12 and joining the first heated body 10 and the second heated body 20 together. As above, the first heated body 10 and the second heated body 20 include the first heated portion and the second heated portion, respectively. Thereby, the joined component 100 in which the brazing material uniformly and excellently joins the first heated body 10 and the second heated body 20 together between the insertion portion 21 and the inserted portion 12 can be obtained.

Therefore, according to the present embodiment, even if an obstacle is provided on the heated bodies, uniform and excellent brazing can be performed.

Moreover, according to the present embodiment, since the first heated body 10 and the second heated body 20 are individually inductively heated, uniform brazing can be performed even if contact thermal resistance is large due to a gap between the insertion portion 21 and the inserted portion 12 or a similar situation.

In order to perform more uniform brazing, the second heating conductor portion 3 is preferably provided separate from the insertion opening 11 of the first heated body 10 by a predetermined distance. More in detail, for the following reasons, the second heating conductor portion 3 is preferably provided at a position where a ratio "L/D" satisfies to be 0.4 or more and 0.8 or less. Herein, "L" is a length from the insertion opening 11 to the second heated portion. More in detail, "L" is a length from the insertion opening 11 of the first heated body 10 to a position where the second heating conductor portion 3 is disposed (namely, length from the insertion opening 11 to the center position on induction heating with the second heating conductor portion 3 in the longitudinal direction). Moreover, "D" is an outer diameter of the second heated body 20. Notably, in the case where the conductor tubes 3a and 3b of the second heating conductor portion 3 are obliquely arranged not to be perpendicular to the longitudinal direction of the second heated body 20 or the like or a similar case, "L" is a distance, to the insertion opening 11, from a position which is a center on induction heating with the second heating conductor portion 3 in the longitudinal direction, for example, the center portion of these conductor tubes 3a and 3b in the longitudinal direction.

In this way, in the induction heating device 1 according to the present embodiment, the first heating conductor portion 2 is disposed such that the center position on induction heating in the longitudinal direction is a part of the periphery of the inserted portion 12 of the first heated body 10, and the second heating conductor portion 3 is disposed such that the length "L" from the insertion opening 11 to the center position on induction heating with the second heating conductor portion 3 in the longitudinal direction is 0.4D or more and 0.8D or less. Notably, in the present embodiment, the outer diameter "D" is a diameter of the insertion portion 21 as illustrated in FIG. 2, not limited to this. Namely, generally speaking, the "outer diameter of the second heated body 20" indicates an outer diameter of a portion contributing uniform temperature resulting from thermal diffusion of the second heated body 20. Therefore, the outer diameter of the second heated body 20 sometimes indicates an outer diameter of the second heated body 20, for example, excluding the high heat capacity portion 22 at a position where the second heating conductor portion 3 is provided.

Moreover, in the joined component 100 according to the present embodiment, the center position of the second heated portion of the second heated body 20 in the longitudinal direction is preferably provided at a position where the ratio "L/D" is satisfied to be 0.4 or more and 0.8 or less, where "L" is the distance from the insertion opening 11 of the first heated body 10 to the center position of the second heated portion in the longitudinal direction and "D" is the outer diameter of the second heated body 20. When the second heated body 20 includes the high heat capacity portion 22 as in the present embodiment illustrated in FIG. 1 and FIG. 2, "L" is from the insertion opening 11 to the center position of the high heat capacity portion 22 in the longitudinal direction (which is the same as the extending direction of the connection conductor portion 4). Notably, a position where the second heating conductor portion 3 is actually disposed on the periphery of the second heated body 20 can be different from the center position of the second heated portion in the longitudinal direction depending on precision of positioning the induction heating device 1 (arrangement precision). Due to this, an instruction, for example, beforehand to an operator or the like is preferable that the second heating conductor portion 3 of the induction heating device 1 is substantially disposed at the center position of the second heated portion in the longitudinal direction.

Figure 3:
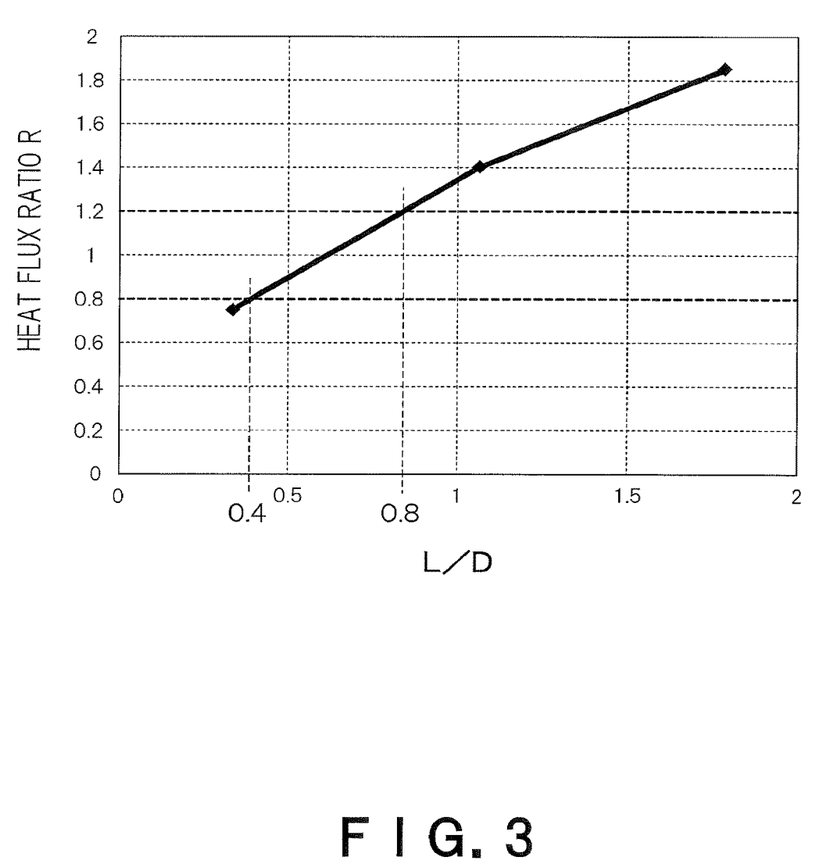
FIG. 3 is a graph illustrating a result of simulation of relation between a heat flux ratio "R" and a ratio "L/D"

FIG. 3 illustrates a result of simulation of relation between the ratio "L/D" and a ratio (heat flux ratio) "R" of a heat flux of the second heated body 20 relative to a heat flux of the first heated body 10. Herein, the heat flux ratio "R" is based on the heat flux of the first heated body 10 as a reference. Therefore, when the heat flux ratio R>1, the heat flux of the second heated body 20 is larger than the heat flux of the first heated body 10. On the other hand, when the heat flux ratio R<1, the heat flux of the second heated body 20 is smaller than the heat flux of the first heated body 10.

In order to perform more uniform brazing, it is preferable that the temperature of the first heated body 10 and the temperature of the second heated body 20 in the brazing portion are made close to each other. Namely, in performing brazing, it is preferable that the temperature of the inserted portion 12 of the first heated body 10 and the temperature of the insertion portion 21 of the second heated body 20 are made close to each other. It is focused on that the heat flux is a parameter regarding the temperature of the first heated body 10 and the temperature of the second heated body 20 and that the temperature of the first heated body 10 and the temperature of the second heated body 20 are close to each other when the heat flux ratio "R" is close to 1.

In the present embodiment, the ratio "L/D" in the occasion when the heat flux ratio "R" indicates to be 0.8 or more and 1.2 or less (namely, 1±20%) is configured to be a position where the second heating conductor portion 3 is provided. As illustrated in FIG. 3, the ratio "L/D" is approximately 0.4 when the heat flux ratio "R" is 0.8 and the ratio "L/D" is approximately 0.8 when the heat flux ratio "R" is 1.2. Therefore, the second heating conductor portion 3 is provided at a position where the ratio "L/D" satisfies to be 0.4 or more and 0.8 or less. In other words, the second heating conductor portion 3 is provided at a position of being separated from the insertion opening 11 by a distance that satisfies L≥0.4D and L≤0.8D.

As mentioned above, the second heating conductor portion 3 is provided separate from the insertion opening 11 to some extent (L≥0.4D). Hence, after heat arising in the second heated body 20 due to the second heating conductor portion 3 comes around into a portion on the obstacle 30 side of the second heated body 20, which is a portion that is not covered with the second heating conductor portion 3, due to thermal diffusion, its thermal conduction to the insertion portion 21 occurs. Due to this, the insertion portion 21 is uniformly heated over the whole periphery from the insertion opening 11 to the tip of the second heated body 20. Meanwhile, the second heating conductor portion 3 is provided not too far from the insertion opening 11 (L≤0.8D). Hence, the temperature of the inserted portion 12 of the first heated body 10 and the temperature of the insertion portion 21 of the second heated body 20 are made close to each other. As the aforementioned result, according to the present embodiment, further uniform and excellent brazing can be performed, which can afford the joined component 100 resulted from joining with a uniform and excellent brazing material.

Next, three modifications according to the present embodiment (Modifications 1 to 3) are described. Any of these modifications can achieve an effect similar to that of the aforementioned embodiment.

(Modification 1)

Figure 4:
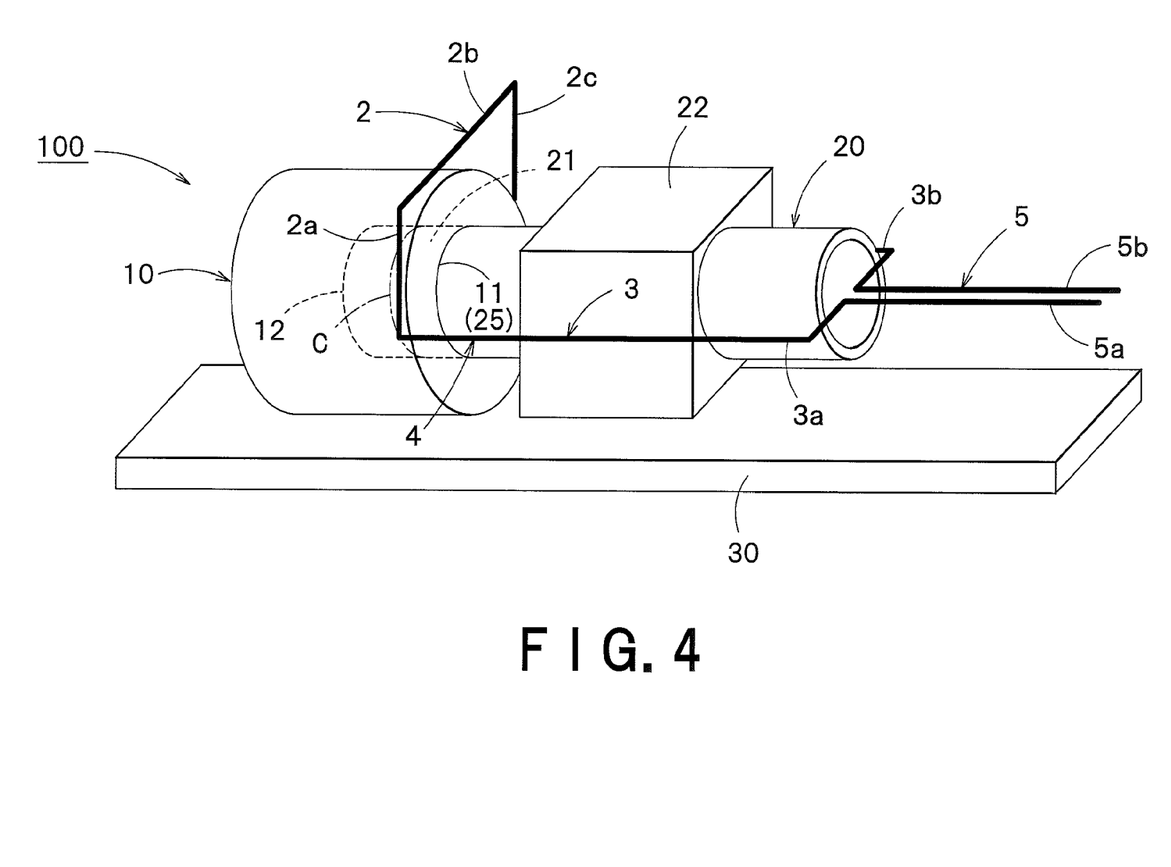
FIG. 4 is a diagram for explaining the heating conductor portions according to Modification 1.

Modification 1 is described with reference to FIG. 4. The present modification is a case where the second heating conductor portion 3 extends along the center axis of the second heated body 20. As illustrated in FIG. 4, the lower end portions of the conductor tubes 2a and 2c are connected to the connection conductor portion 4 in the vicinity of the center axis of the first heated body 10. Moreover, the conductor tubes 3a and 3b extend along the center axis of the second heated body 20.

(Modification 2)

Figure 5:
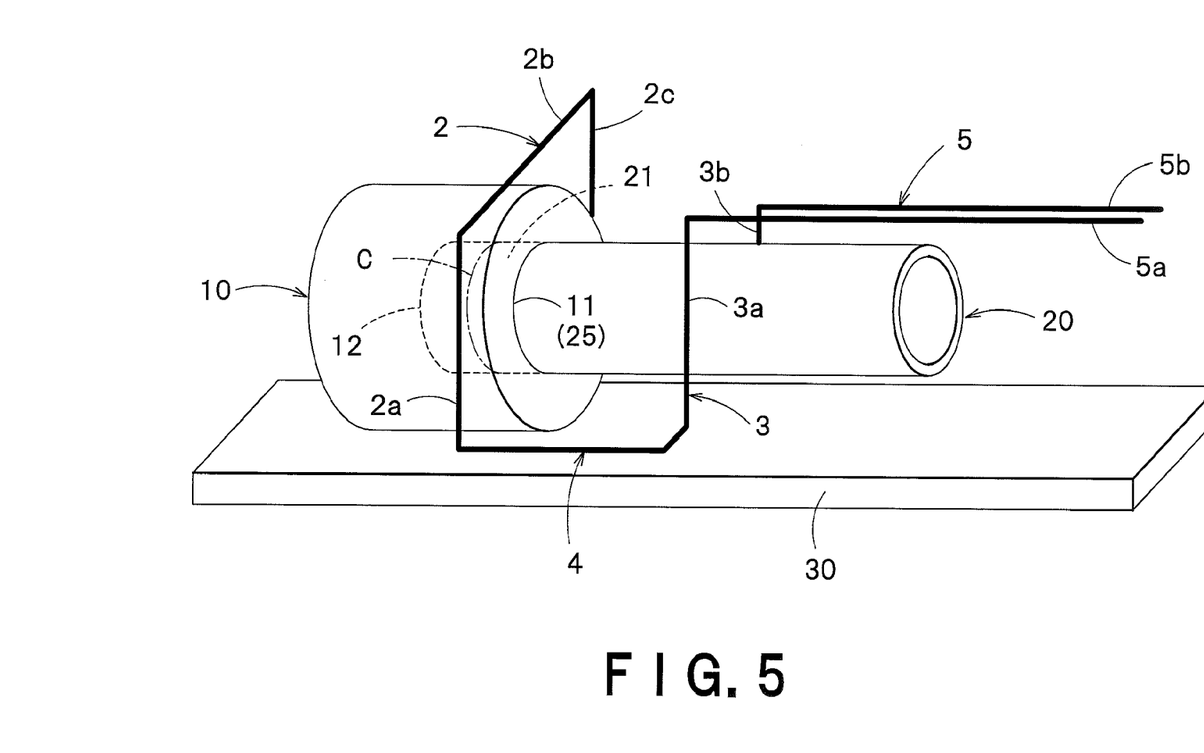
FIG. 5 is a diagram for explaining the heating conductor portions according to Modification 2.

Next, Modification 2 is described with reference to FIG. 5. The present modification is a case where the thick portion 22 is not provided in the second heated body 20. As illustrated in FIG. 5, the first heating conductor portion 2 and the connection conductor portion 4 are the same as those in the already described embodiment. As illustrated in FIG. 5, the conductor tubes 3a and 3b extend from the end portions of the connection conductor portion 4 toward the second heated body 20, after that, extend in the direction perpendicular to the center axis of the second heated body 20, and cover a part of the periphery of the second heated body 20.

(Modification 3)

Figure 6:
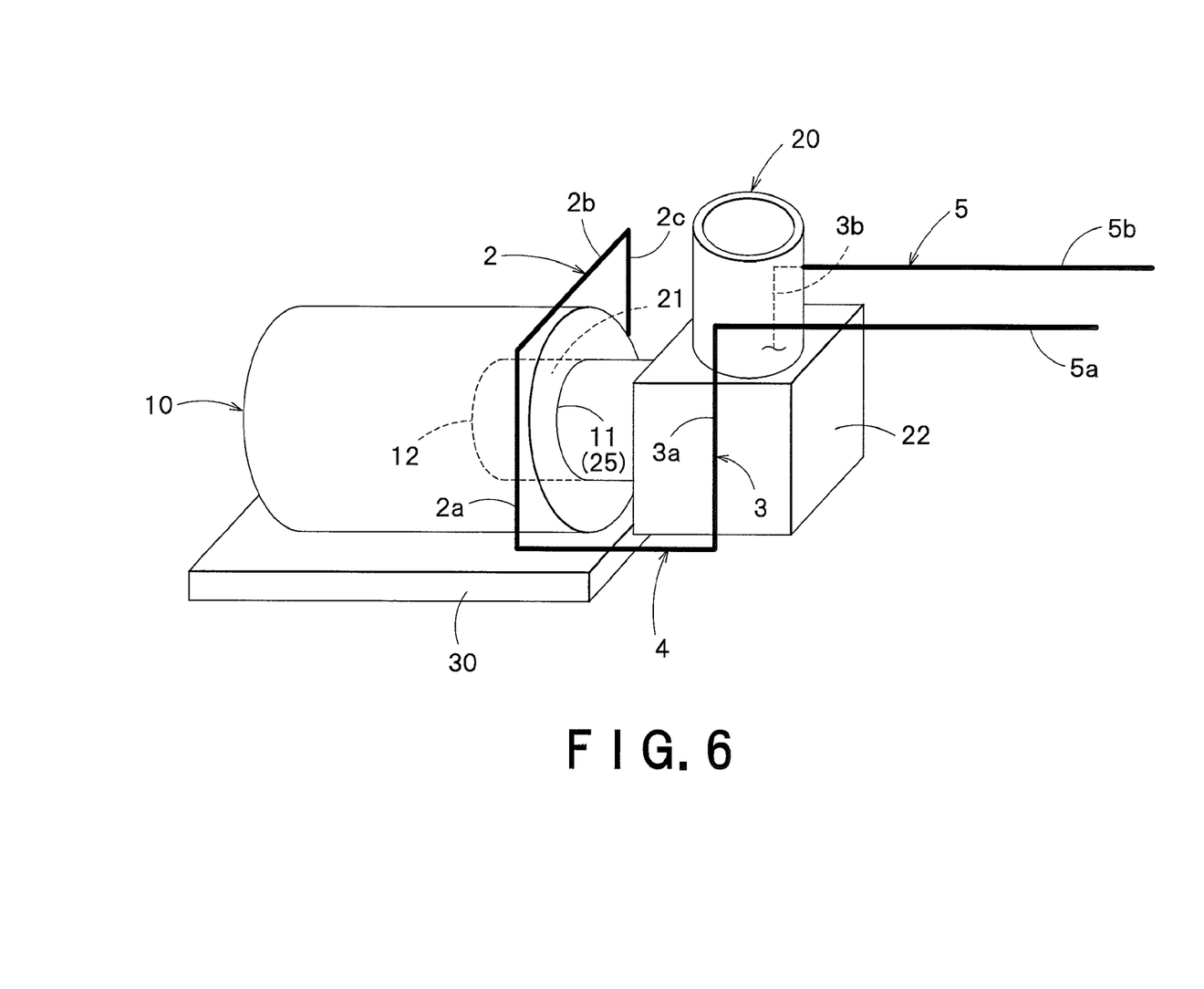
FIG. 6 is a diagram for explaining the heating conductor portions according to Modification 3.

Next, Modification 3 is described with reference to FIG. 6. The present modification is a case where the second heated body 20 is bent in the middle into an L-shape. As illustrated in FIG. 6, the first heating conductor portion 2 and the connection conductor portion 4 are the same as those in the already described embodiment. As illustrated in FIG. 6, the conductor tubes 3a and 3b extend from the end portions of the connection conductor portion 4 along the center axis of the second heated body 20 that has been bent to cover a part of the periphery of the thick portion 22 of the second heated body 20.

Herein, a joining method according to the present embodiment is described.

First, the insertion portion 21 of the second heated body 20 is inserted into the inserted portion 12 of the first heated body 10 through the insertion opening 11. Next, the brazing material is disposed between the inserted portion 12 and the insertion portion 21. Notably, to dispose the brazing material may also be simultaneously performed in inserting the insertion portion 21 into the inserted portion 12. Next, the high frequency current is caused to flow in the first heated portion and the second heated portion, the first and second heated portions are individually inductively heated to braze the first heated body and the second heated body with the aforementioned brazing material. In the present joining method, the second heated portion is provided at a position where the ratio "L/D" satisfies to be 0.4 or more and 0.8 or less, where "L" is the length from the insertion opening 11 to the second heated portion and "D" is the outer diameter of the second heated body 20. In this way, uniform and excellent brazing can be performed.

As above, one embodiment and its three modifications have been described. According to this embodiment and these modifications, uniform and excellent brazing can be performed even if an obstacle is provided on the heated bodies.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A joined component comprising:
a first heated body comprising an insertion opening and an inserted portion coupled with the insertion opening;
a second heated body comprising an insertion portion inserted into the inserted portion through the insertion opening;
a brazing material disposed between the insertion portion and the inserted portion, thereby joining the first heated body and the second heated body together;
a first heated portion provided at a first position including at least a part of the inserted portion and at least a part of the insertion portion; and
a second heated portion provided at a second position separate from the insertion portion where a ratio "L/D" satisfies to be 0.4 or more and 0.8 or less, where "L" is a length from the insertion opening to the second heated portion and "D" is an outer diameter of the second heated body.

2. The joined component of claim 1, wherein the second heated portion is provided with a high heat capacity portion larger in heat capacity than another portion of the second heated body.

3. A rotary electric machine comprising:
a cylindrical stator including an inner coil provided along an inner wall surface, and an outer coil provided along an outer wall surface; and
the joined component of claim 1, the first heated body provided in an end portion of one coil of the inner coil and the outer coil, the second heated body provided in an end portion of the other coil of the inner coil and the outer coil.

4. An induction heating device, comprising:
a first heating conductor configured to circumferentially cover at least a part of a periphery of a first heated body; and
a second heating conductor configured to circumferentially cover at least part of a periphery of a second heated body,
wherein,
the first heated body comprises an insertion opening and the inserted portion coupled with the insertion opening,
the second heated body comprises an insertion portion inserted into the inserted portion through the insertion opening,
a brazing material, configured to join the first heated body and the second heated body together, is disposed between the insertion portion and the inserted portion,
the first heating conductor is configured to heat a first position including at least a part of the inserted portion and at least a part of the insertion portion,
the second heating conductor is configured to heat a second position separate from the insertion portion where a ratio "L/D" satisfies to be 0.4 or more and 0.8 or less, where "L" is a length from the insertion opening to the second position and "D" is an outer diameter of the second heated body.

5. The induction heating device of claim 4, further comprising a connection conductor configured to connect the first heating conductor and the second heating conductor together.

6. The induction heating device of claim 4, wherein a projection line of the first heating conductor onto the insertion portion inserted into the inserted portion overlaps with a center line of the insertion portion.

7. The induction heating device of claim 4, further comprising:
a high frequency power supply configured to cause a high frequency current to flow in the first and second heating conductor;
a temperature detector configured to measure a first temperature of the first heated body in a vicinity of the insertion opening and/or a second temperature of the second heated body in a vicinity of the insertion opening;
a reference temperature data recorder configured to store temperature data in which at least any one temperature of the first temperature and the second temperature is associated with a temperature of a brazing portion; and
a temperature controller configured to control the high frequency power supply such that the temperature of the brazing portion becomes a predetermined temperature, based on the temperature measured by the temperature detector and the temperature data stored in the reference temperature data recorder.

8. A joining method comprising:
providing a first heated body comprising an insertion opening and an inserted portion coupled with the insertion opening;
providing a second heated body comprising an insertion portion configured to be inserted into the inserted portion through the insertion opening;

inserting the insertion portion of the second heated body into the inserted portion of the first heated body through the insertion opening;
disposing a brazing material between the inserted portion and the insertion portion;
inductively heating a first position including at least part of the inserted portion and at least part of the insertion portion; and
inductively heating a second position that is other than the insertion portion,
wherein a location of the second position satisfies a ratio "L/D" to be 0.4 or more and 0.8 or less, where "L" is a length from the insertion opening of the first heated body to the second position and "D" is an outer diameter of the second heated body.

* * * * *